United States Patent [19]

Kloker et al.

[11] Patent Number: 4,575,812
[45] Date of Patent: Mar. 11, 1986

[54] X×Y BIT ARRAY MULTIPLIER/ACCUMULATOR CIRCUIT

[75] Inventors: Kevin L. Kloker, Arlington Heights; Ronald H. Cieslak, Chicago, both of Ill.

[73] Assignee: Motorola, Inc., Schaumburg, Ill.

[21] Appl. No.: 615,989

[22] Filed: May 31, 1984

[51] Int. Cl.$^4$ .............................................. G06F 7/52
[52] U.S. Cl. ................................................... 364/760
[58] Field of Search ............... 364/760, 759, 757, 736

[56] References Cited

U.S. PATENT DOCUMENTS 4,153,938 5/1979 Ghest et al. ........................ 364/760
4,168,530 9/1979 Gajski et al. ....................... 364/760

OTHER PUBLICATIONS

Pezaris, "A 40-ns 17-Bit by 17-Bit Array Multiplier" *IEEE Trans. on Computers*, vol. c-20, No. 9, Apr. 1971, pp. 442-447.

Iwamura et al., "A 16-Bit CMOS/SOS Multiplier-Accumlator," 1982 *IEEE Int. Conf. ON Ckts., & Computers*, Sep. 29, 1982, pp. 151-154.

Hartgring et al., "High-Speed Low-Power Silicon MESFET Parallel Multipliers" *J. of Solid State Ckts.* vol. SC-17, No. 1, Feb. 1982, pp. 69-73.

Waser, "High-Speed Monolithic Multipliers For Real-Time Digital Signal Processing" *Computer* Oct. 1978, pp. 19-29.

*Primary Examiner*—David H. Malzahn
*Attorney, Agent, or Firm*—Anthony J. Sarli, Jr.; Jeffrey Van Myers; Robert L. King

[57] ABSTRACT

An X×Y bit array multiplier/accumulator circuit is provided for adding an input number having (X+Y) bits to an (X+Y) bit product of an X bit number and a Y bit number, where X and Y are integers. Modified Booth's algorithm is implemented with an array structure which maintains a regular and systematic structure. The array structure uses adders and multiplexers in a predetermined column and row arrangement. Propagation delay is minimized while utilizing the modified Booth's algorithm by using a sum skipping technique and by using inverting logic properties of adders. Sign bit extension is provided by additional logic circuitry and signed/unsigned modes of operation are provided.

20 Claims, 21 Drawing Figures

X×Y BIT ARRAY MULTIPLIER/ACCUMULATOR CIRCUIT

TECHNICAL FIELD

This invention relates generally to multiplier and multiplier/accumulator circuits and, more particularly, to multiplier and multiplier/accumulator circuits which implement modified Booth's algorithm.

BACKGROUND ART

Circuits which multiply two numbers and sum or accumulate the resulting product with a third number are widely used in signal processing. A typical application of a multiplier/accumulator is the implementation of a finite impulse response (FIR) digital filter which sums N products to obtain a sample value at a predetermined time, where N is an integer. A primary objective in performing multiplications and accumulations is to accomplish the mathematical calculation as quickly as possible. However, an increase in speed typically involves an increase in the amount of circuitry and irregularity of structure. Various attempts to increase the speed of an array multiplier have been made. Stylianos Pezaris in an article entitled "A 40-ns 17-Bit by 17-Bit Array Multiplier" in IEEE *Transactions on Computers*, Vol. C-20, No. 4, April 1971, pp. 442–447, teaches the reduction of propagation path delays by using carry-save adders modified by a "sum skip" arrangement to speed up vertical propagation of sum signals in an array multiplier. Since the Lincoln multiplier is a conventional multiplier, N rows of adders are required for an N-bit by N-bit multiplier to implement a multiplication in a conventional carry save scheme. Others have skipped both sum and carry signals over alternate rows of adders in a multiplier array as taught by Iwamura et al. in "A 16-Bit CMOS/SOS Multiplier-Accumulator" in IEEE *International Conference on Circuits and Computers*, Sept. 29, 1982, pp. 151–154. Iwamura et al. describe on page 151 of the above noted article a multiplier which utilizes a row skipping technique of carry and sum signals. The skipping technique is used with a conventional array multiplier rather than other methods such as Wallace's tree or Booth's method because of the complicated interconnections and irregularity of structure associated with these other methods. However, by skipping carry and sum signals over the next row, the array is effectively divided into two separate arrays, each of which provides a sum and a carry accumulation. At the bottom of the array, two combining rows of adders (not shown by Iwamura et al.) are required. The combining rows reduce the four outputs (two sums and two carrys) of the separate accumulator paths to two outputs (one sum and one carry) for carry propagation in a final row. A final row of carry look ahead adders is required to provide the output product. As stated by Iwamura et al., this method is used instead of techniques such as Booth's method or Wallace's tree because of the complicated interconnections and poor structural regularity of the latter scheme. A disadvantage with the multiplier taught by Iwamura et al. is that two rows of combining adders are required, thereby creating additional propagation delays.

Hartring et al. in an article entitled "High-Speed Low-Power Silicon MESFET Parallel Multipliers" in IEEE *Journal of Solid-State Circuits*, Vol. SC-17, No. 1, February 1982, pp. 69–73, teach the use of a conventional array multiplier using a systematic carry-save adder scheme. Speed is improved by utilizing both positive and negative logic properties of full adders to provide inverting multiplier cells. Hartring et al. teach the use of a combinatorial multiplier over other methods such as modified Booth's algorithm and the Wallace scheme because the latter methods are slower and less systematic in structure.

SUMMARY OF THE INVENTION

An object of the present invention is to provide an improved X×Y bit array multiplier/accumulator circuit, where X and Y are integers, for multiplying two numbers or multiplying two numbers and accumulating the resulting product with a third number.

Another object of the invention is to provide an improved array multiplier/accumulator circuit which utilizes modified Booth's algorithm and which has a systematic and uniform array structure.

A further object of the present invention is to provide an improved array multiplier/accumulator circuit which implements modified Booth's algorithm and which has improved speed by minimizing propagation delays between adders.

Yet a further object of the present invention is to provide an improved array multiplier/accumulator circuit which implements modified Booth's algorithm and which has improved speed by using both positive and negative logic circuits.

In carrying out the above and other objects of the present invention there is provided, in one form, an X×Y bit array multiplier/accumulator circuit where X and Y are integers. The circuit is capable of either adding an (X+Y) bit input number to the (X+Y) bit product of an X bit and a Y bit number. The circuit may also only provide the product of the X bit and Y bit numbers. Encoding circuitry is provided for implementing modified Booth's algorithm in response to the Y bit number and for providing a rank ordered plurality of first control signals in accordance with modified Booth's algorithm. At least (Y/2) rank ordered rows of (X+2) rank ordered multiplexing circuits are provided wherein each row is controlled by a predetermined one of the first control signals. The multiplexing circuits form (X+Y) rank ordered columns, wherein the first row includes multiplexing circuits forming columns of rank 1 to (X+2) and the (Y/2)th row includes multiplexing circuits forming columns of rank (Y−1) to (X+Y). The remaining rows of multiplexing circuits, if any, have multiplexing circuits each of which is included in a predetermined column. The first multiplexing circuit of each such remaining row or rows have a column rank which is two ranks greater than the first multiplexing circuit of the row of immediately lower rank. Each multiplexing circuit has inputs selectively coupled to either predetermined bits of the X bit number, to predetermined logic levels, or to a sign mode control signal for signed/unsigned mode of operation. The multiplier/accumulator array also comprises at least (Y/2) rank ordered rows of adder circuits. Of the (Y/2) adder rows, the [(Y/2)−2] rows of lowest rank comprise (X+1) adder circuits, the row of next to highest rank comprises (X+Y−4) adder circuits, and the row of highest rank comprises (X+Y) carry propagate adder circuits. Each of the (X+1) adder circuits has a predetermined column rank and an output sum propagation delay which is substantially twice an output carry delay thereof. The (X+1) adder circuits of highest row rank each provide an output sum bit which is a partial product sum of predetermined rank and which is coupled as an input to an adder input of an adder having the same column rank but a row rank which is one rank greater. Each (X+1) adder circuit of remaining lower ranked rows provides an output sum bit which is a partial product sum of predetermined rank and which is coupled as an input to an adder input of an adder having the same column rank at a row rank which is two ranks greater. In other words, the sum bit is skipped over the immediately following row of adders. Each of the (X+1) adder circuits also provides an output carry bit which is coupled as an input carry bit to an adder input of an adder having a column rank and a row rank which is one rank greater. The row of (X+Y) adders provide the (X+Y) bits of the output accumulated product. Sign extension circuitry is coupled to the multiplexing circuits and to the adder circuits for providing an output sign bit.

DETAILED DESCRIPTION OF THE PRESENT INVENTION

A conventional method used to improve the speed of a multiplication is to reduce the number of summands created during the multiplication. The number of summands can be reduced by means of a multiplier recoding scheme wherein more than one multiplier bit is examined simultaneously and multiple-bit shifts are made. A conventional recoding method which involves a constant shift of two bits between examinations of multiplier bit sets is known as modified Booth's algorithm. Each recoding operation requires examining two multiplier bits $Y_i$ and $Y_{i+1}$ and a previous bit $Y_{i-1}$. The advantage of the recoding operation is that one partial product results rather than two partial products which would result for two multiplier bits without utilizing recoding. However, the partial product may be one of five different operations as compared to two different operations for a nonrecoded partial product. For purposes of briefly illustrating a well known form of modified Booth's algorithm and the recoding operation associated with this form of Booth's algorithm, a conventional truth table is shown below.

TABLE 1

| $Y_{i+1}$ | $Y_i$ | $Y_{i-1}$ | NET EFFECT | OPERATION |
|---|---|---|---|---|
| 0 | 0 | 0 | +0 | Add 0 |
| 0 | 0 | 1 | +1 | Add 1X |
| 0 | 1 | 0 | +1 | Add 1X |
| 0 | 1 | 1 | +2 | Add 2X |
| 1 | 0 | 0 | +2 | Subtract 2X |
| 1 | 0 | 1 | +3 | Subtract 1X |
| 1 | 1 | 0 | +3 | Subtract 1X |
| 1 | 1 | 1 | +4 | Subtract 0 |

The modified Booth's algorithm sometimes requires a subtraction to be performed. The bit $Y_{i+1}$ may be used to indicate subtraction and a resulting two's complement can be performed by adding its value to the LSB of the partial product. An example of a multiplication operation utilizing modified Booth's algorithm in conjunction with the present invention will be illustrated below.

Figure 1A:
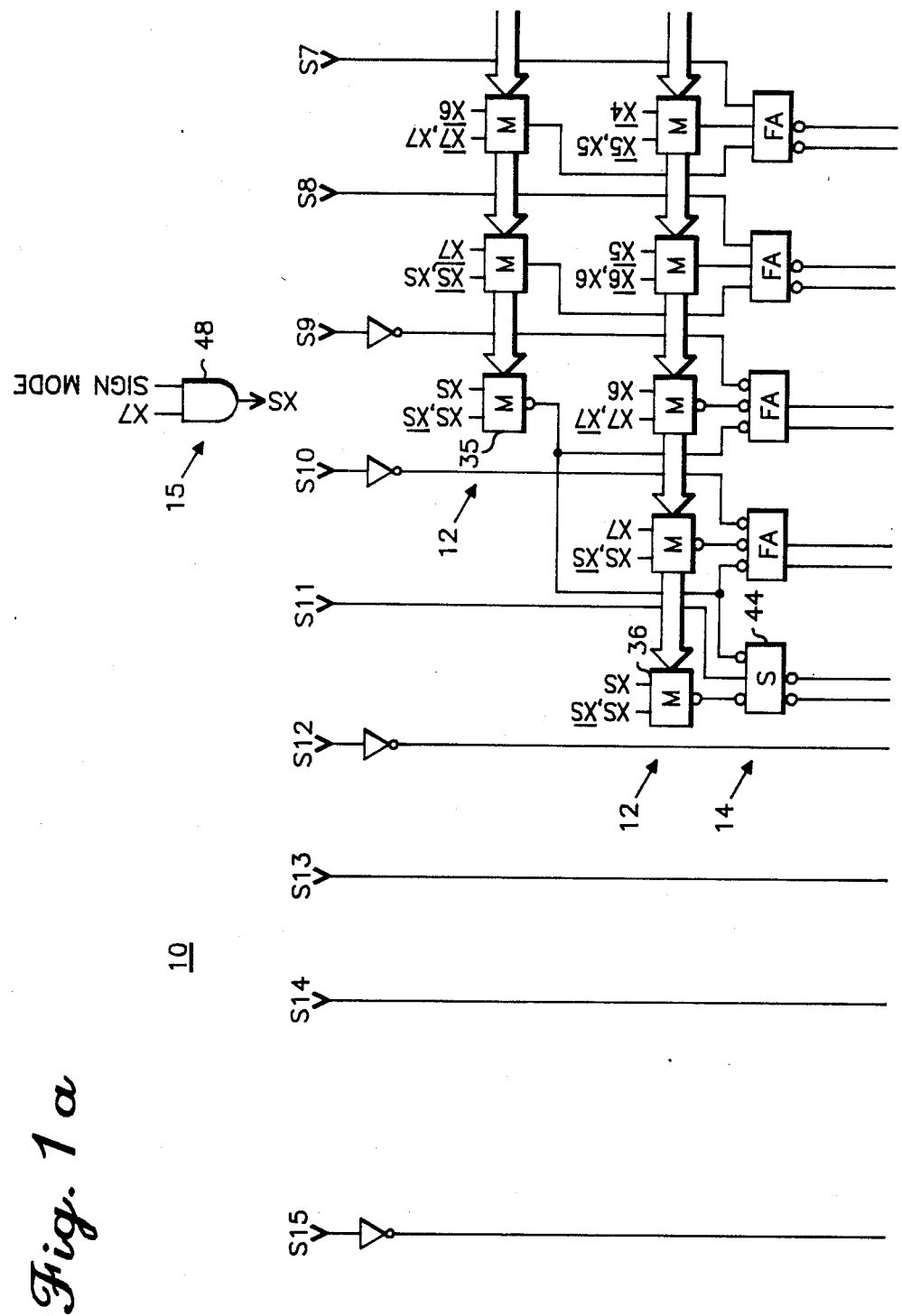
FIGS. 1(a)-1(d), in combination, illustrate a complete block diagram of an X×Y bit array multiplier/accumulator in accordance with the present invention.
Figure 1B:
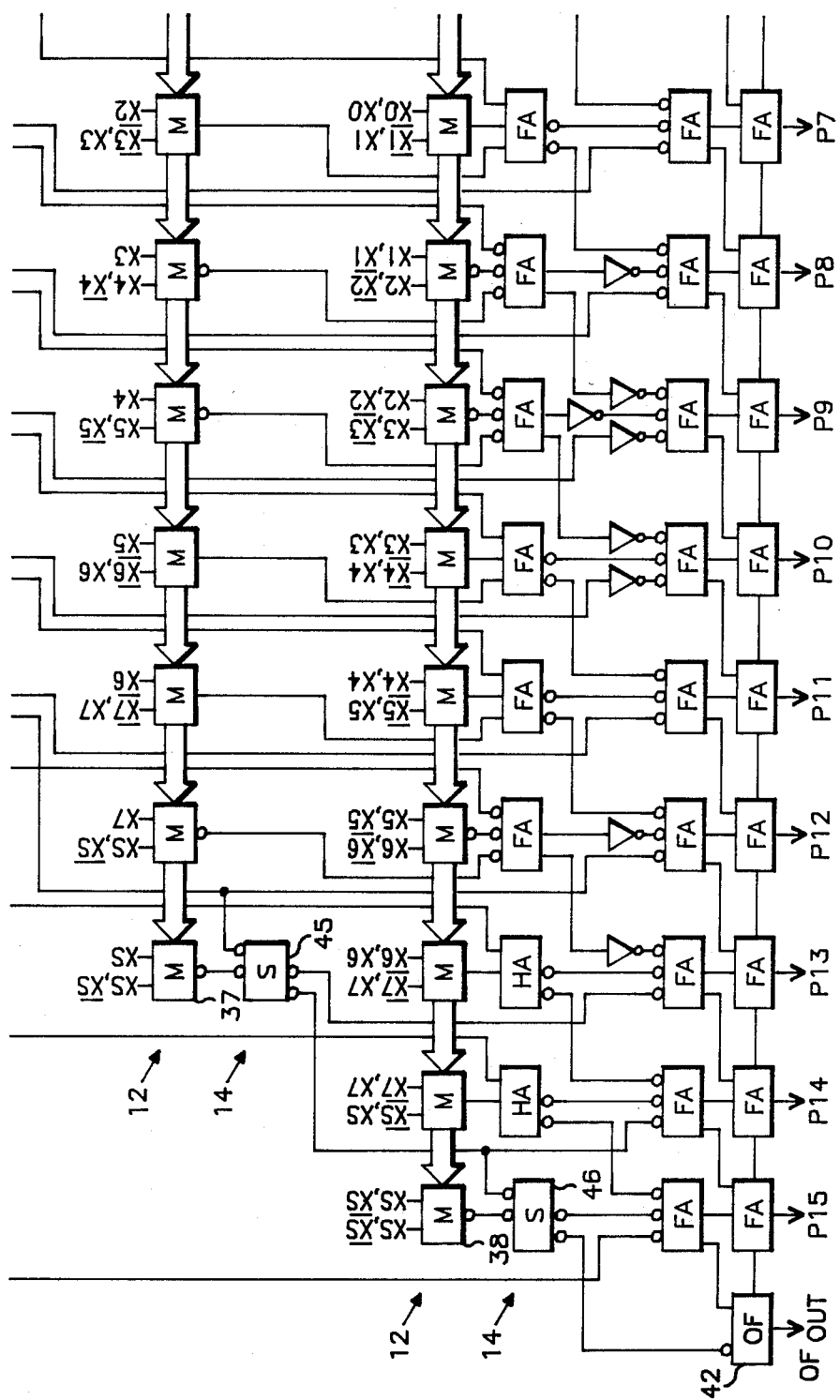
Figure 1C:
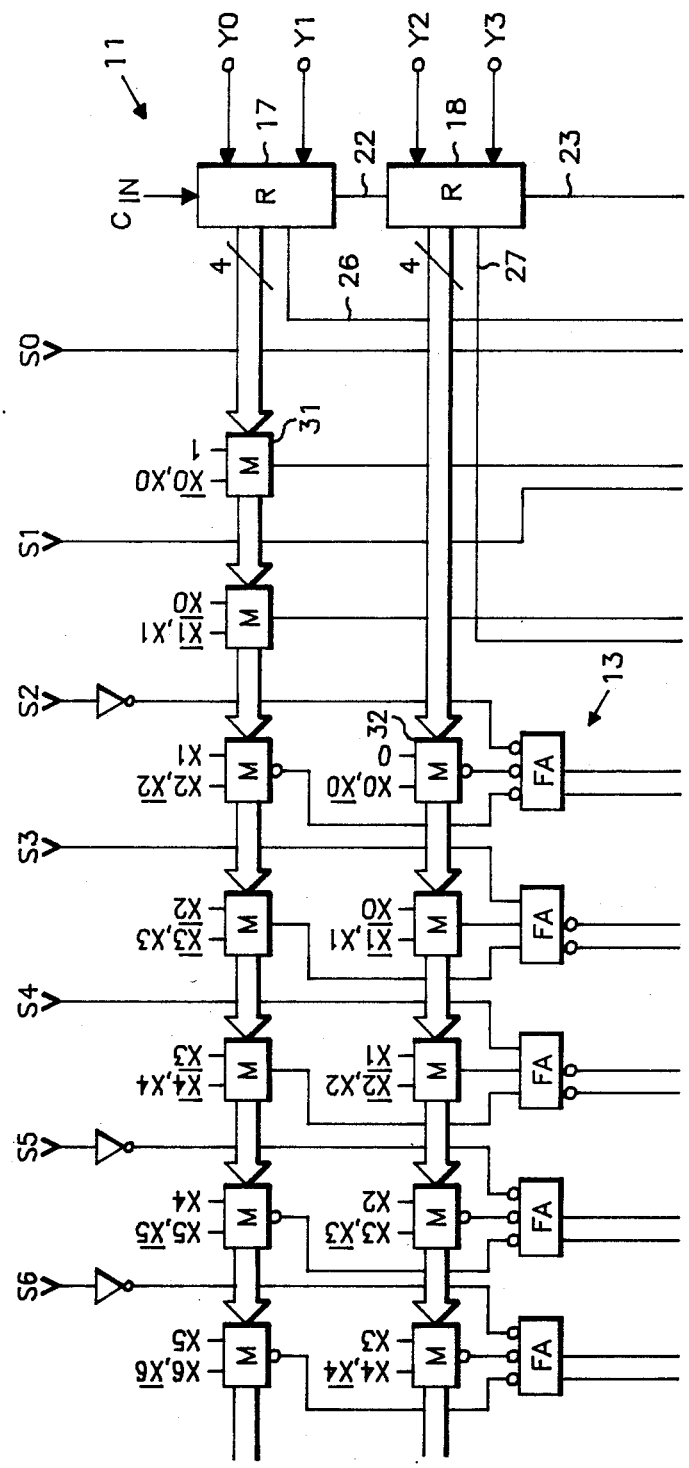
Figure 1D:
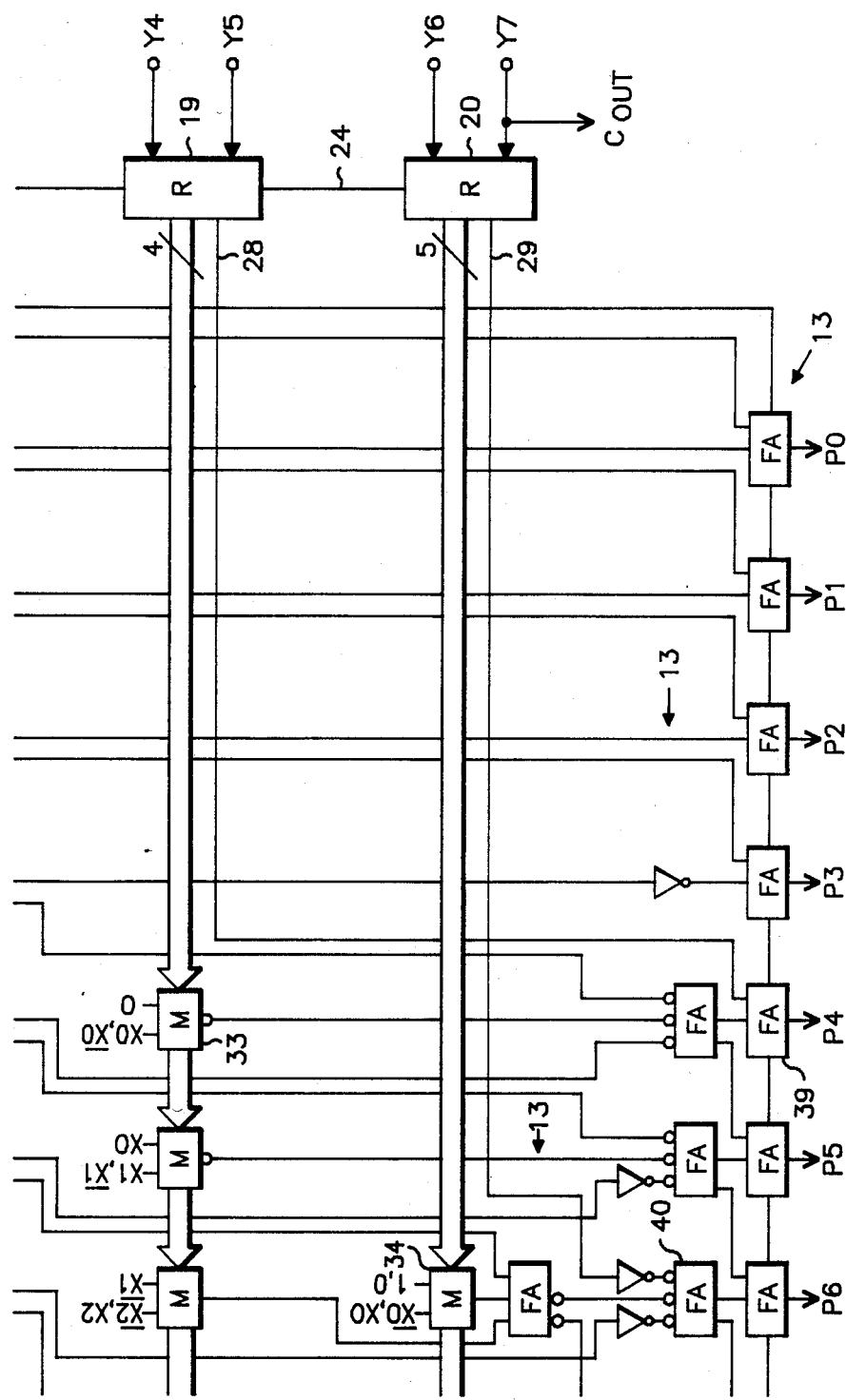
Figure 2:
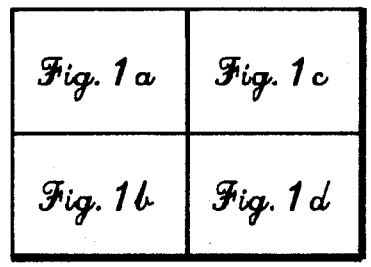
FIG. 2 is a diagram illustrating how FIGS. 1(a)-1(d) may be fitted together to provide a complete block diagram of the multiplier/accumulator.

Shown in FIGS. 1(a), 1(1), 1(c) and 1(d) is a block diagram of an array multiplier/accumulator 10. Shown in FIG. 2 is a diagram illustrating how FIGS. 1(a)-1(d) may be placed side by side to form a complete diagram of multiplier/accumulator 10. In the illustrated form, multiplier/accumulator 10 is an 8×8 bit array multiplier/accumulator for multiplying eight bits Y0, Y1, Y2, Y3, Y4, Y5, Y6 and Y7 of a multiplier number with eight bits X0, X1, X2, X3, X4, X5, X6 and X7 of a multiplicand number. Concurrently, the resulting sixteen bit product is added to a sixteen bit input number having input bits S0-S15 to provide sixteen output bits P0-P15 representing an accumulated product. It should be well understood that the invention may be practiced by multiplying numbers having the same or differing number of bits. As will be explained below, the regularity of the structure may be maintained regardless of the bit size of the mulipller and multiplicand. The bit size of the sum input number to be added to the resulting product must be at least the sum of the bits of the multiplier and the multiplicand. In general, multiplier/accumulator 10 comprises an encoding portion 11, a multiplexing portion 12, an adder portion 13, and a sign bit extension portion 14. A sign mode portion 15 provides a mode control signal for signed and unsigned modes of the multiplicand number.

Encoding portion 11 comprises a rank ordered plurality of recoder circuits 17, 18, 19 and 20. Each recoder circuit has two inputs for receiving two predetermined input bits of the multiplier number bits Y0-Y7. A carry input bit, $C_{IN}$, is coupled to a carry input of recoder circuit 17. A carry output bit of recoder circuit 17 is coupled to a carry input terminal of recoder circuit 18 via a conductor 22. A carry output bit of recoder circuit 18 is coupled to a carry input terminal of recoder circuit 19 via a conductor 23, and a carry output bit of recoder circuit 19 is coupled to a carry input terminal of recoder circuit 20 via a conductor 24. Input bit Y7 is utilized as a carry out bit, $C_{OUT}$, which can be coupled back to the carry input of recoder circuit 17 on successive multiplications if multiple precision Y multiplier values are used. Recoder circuits 17, 18, 19 and 20 each provide a plurality of rank ordered control signals. In a preferred form, recoder circuits 17, 18 and 19 provide four control signals C1, C2, C3 and C4 and recoder circuit 20 provides five control signals C1, C2, C3, C4 and C5. Recoder circuits 17, 18, 19 and 20 also provide an output subtract signal via conductors 26, 27, 28 and 29, respectively.

Multiplexer portion 12 comprises at least (Y/2) rank ordered rows of multiplexers, where Y is the number of mutiplier bits. Each multiplexer is labeled "M" in FIGS. 1(a)-1(d). The number of multiplexers in each row is (X+2), where X is the number of multiplicand bits. The multiplexers form (X+Y) rank ordered columns. The column of lowest rank is the column which provides output bit P0 and the column of highest rank provides output bit P15. The first multiplexer of the lowest ranked row is multiplexer 31 which is the lowest column ranked multiplexer of its row. The lowest column ranked multiplexer of the next higher ranked row of multiplexers is multiplexer 32. However, multiplexer 32 is positioned in a column of two ranks greater than the column of multiplexer 31. The lowest column ranked multiplexer of the next higher ranked row of multiplexers is multiplexer 33. Multiplexer 33 is positioned in a column of two ranks greater than the column of multiplexer 32. Similarly, multiplexer 34 is positioned in a column having a rank which is two ranks greater than the column rank of multiplexer 33. The lowest column ranked multiplexer of the highest ranked row of multiplexers is multiplexer 34. The highest column ranked multiplexers of each row of multiplexers from lowest to highest row rank are multiplexers 35, 36, 37 and 38, respectively.

The multiplexers of the highest ranked row of multiplexers each have five inputs. Each input of the five input multiplexers is selectively coupled to a multiplexer output in response to a predetermined one of the five control signals provided by recoder circuit 20. Although only four input signals are shown as being coupled to each multiplexer of the highest ranked row, an additional signal such as a high or a low logic level is utilized. Typically, in a noninverted adder or multiplexer cell, a power supply voltage $V_{DD}$ is used to designate a high logic level and a power supply voltage $V_{SS}$ is used to designate a low logic level. The inputs which are coupled to multiplexer 34 are the first multiplicand bit X0 and the complement thereof, a logic "1", and a logic "0". In addition, an internal logic level is utilized as a fifth input signal to multiplexer 34. The next higher ranked multiplexer of the same row utilizes input bits X0, X1, the complements thereof, and an internal logic level as its five input signals. Further illustration of the five input multiplexer structure will be given below.

Each of the multiplexers of all other lower ranked rows of multiplexers has four inputs. Each input of the four input multiplexers is selectively coupled to a multiplexer output in response to a predetermined one of the four control signals provided by one of recoders 17, 18 or 19. Although only three input signals are shown as being coupled to each multiplexer of all the other lower ranked rows of multiplexers, an additional input such as a high or low logic level is utilized to provide four input signals. Further illustration of the four input multiplexer structure will also be given below.

Adder portion 13 comprises a rank ordered plurality of at least (Y/2) rows of adder circuits. The lowest ranked row of adders is positioned in the array immediately after the two lowest ranked rows of multiplexers. The lowest ranked row of adders comprise (X+1) adders or nine adders when an eight bit multiplicand is used. In a preferred form, the adders of the lowest ranked row are carry save full adders designated by "FA" and having three inputs. Each input of the adders is adapted for receiving either a predetermined output from one of the multiplexers of the two lowest ranked rows or a predetermined bit of the (X+Y) bit input number. Each adder has a sum output for providing a partial product sum of predetermined rank which is coupled to an adder input of an adder having the same adder column rank and an adder row rank two ranks greater. In other words, the sum output is skipped over the immediately following row of adders. Each adder also has a carry output which provides a carry input signal to an adder input of an adder having an adder column rank one greater and an adder row rank one greater. Specific adder circuit details will be discussed below.

In the illustrated form, the next higher ranked row of adders is separated from the lowest ranked row of adders by two rows of multiplexers and also comprises (X+1) or nine adders. In a preferred form, the (X−1) adders of lowest column rank are full adder circuits having three inputs, and the two highest column ranked adders are half adder circuits designated by "HA" and having two inputs. Two of the three inputs of each of the full adder circuits are sum inputs which are coupled to multiplexer outputs of the two intervening rows of multiplexers. The third input of each of the full adder circuits is coupled to either a predetermined carry output of the lowest ranked row of adders or to a predetermined bit of the (X+Y) bit input number. One of the inputs of each of the half adder circuits is a predetermined bit of the (X+Y) bit input number and the other input is a multiplexer output of a multiplexer having the same column rank and forming the second row of the two intervening rows of multiplexers. Each of the full and half adders provide a sum output and a carry output.

In the illustrated form of an 8×8 bit array multiplier, two rows of multiplexing means are interposed between the ranked rows of [(Y/2)−2] adders. However, if a larger array size is utilized, only one ranked row of multiplexers is interposed between the remaining [(Y/2)−2] rows of adders after the two lowest ranked rows of adders. With the exception of the two highest column ranked adders of each additional row, each adder of such additional rows of [(Y/2)−2] adders not shown would have three inputs. A first input of such additional adders would be coupled to a multiplexer output of equal column rank from the interposed row of multiplexers. A second input would be coupled to an adder carry output of one less column rank and one less row rank. A third input would be coupled to an adder sum output of equal column rank and a two lower row rank. The two highest column ranked adders of each such additional row of adders would only have two inputs and would be implemented as half adders. The two inputs would be coupled to either a predetermined multiplexer output or a predetermined bit of the accumulated input number.

Regardless of the actual number of rows of $[(Y/2)-2]$ adders, the sum output of each adder of the highest ranked row of $[(Y/2)-2]$ adders is coupled to an input of an adder of the next to highest ranked row of adders and having the same column rank. The carry output of each adder of the highest ranked row of $[(Y/2)-2]$ adders is coupled to an adder of the next to highest ranked row of adders and having the next greater column rank.

The next to highest ranked row of adders is positioned immediately after the row of adders receiving the highest ranked multiplexer row and comprises $(X+Y-4)$ adders. In the preferred form, the $(X+Y-4)$ adders are full adder circuits having three inputs for receiving a bit representing either a partial product bit, a predetermined subtract signal bit used to perform subtraction associated with recoders 17-20 and modified Booth's algorithm, or a predetermined bit of the $(X+Y)$ bit input number. The five highest column ranked adders receive a sign bit from sign bit extension portion 14. In the particular illustrated form, all adders except the two lowest column ranked adders each have an input connected to a sum output of the row of adders of immediately lower row rank. All adders of the next to highest ranked row except the lowest three column ranked adders have a carry-in input connected to a carry-out output of the adder of immediately lower row and column rank. An inverted subtract signal of recoder 20 is connected to a carry-in input of an adder 40 via conductor 29. A carry-out output of the highest column ranked adder of the next to highest ranked row of adders is connected to a first input of an overflow circuit 42. In a general form, only the highest column ranked $(X+1)$ adders in the next to highest ranked row of adders each have an input coupled from a sum output of an adder of corresponding column rank and an immediately lower row rank.

The highest ranked row of adders is positioned immediately after the next to highest ranked row of adders and comprises $(X+Y)$ carry propagate adders, each of which provides an output bit of the total multiply/accumulator. The two lowest column ranked adders each have a first sum input bit coupled to a predetermined bit of the $(X+Y)$ bit input number. The two lowest column ranked adders each have a second sum input bit connected to the output of the two lowest column ranked multiplexers of the lowest ranked row, respectively. The lowest column ranked adder of the highest ranked row has a carry-in input connected to a subtract signal of recoder 17 via conductor 26. A carry-out output of each adder is connected to a carry-in input of an adder of immediately greater column rank from the lowest column ranked adder to the highest column ranked adder. The carry-out output of the adder of greatest column rank is connected to a second input of overflow circuit 42. A carry-in input of an adder 39 is connected to a substract signal from recoder 19 via conductor 28.

Sign bit extension portion 14 comprises sign bit circuits 44, 45 and 46. Sign bit circuit 44 has a first input connected to the output of the highest column ranked multiplexer of the next to lowest ranked row, a second input connected to a predetermined bit of the $(X+Y)$ bit input number, and a third input connected to the output of the highest column ranked multiplexer of the lowest ranked row. First and second outputs of sign bit circuit 44 are connected to inputs of predetermined adders of either an adder row of two row ranks greater or the next to highest ranked adder row, depending upon the number of adder rows. Sign bit circuit 45 has a first input connected to the output of the highest column ranked multiplexer of the next to highest ranked row of multiplexers. A second input of sign bit circuit 45 is connected to the first output of sign bit circuit 44. First and second outputs of sign bit circuit 45 are connected to inputs of predetermined adders of either an adder row of two row ranks greater or the next to highest ranked adder row, depending upon the number of adder rows. Sign bit circuit 46 has a first input connected to the output of the highest column ranked multiplexer of the highest ranked row of multiplexers. A second input of sign bit circuit 46 is connected to the first output of sign bit circuit 45. Sign bit circuit 46 has a first output connected to a third input of overflow circuit 42, and a second output connected to an input of the highest column ranked adder of the next to highest ranked row of adders.

Sign mode portion 15 comprises an AND logic gate 48 for providing a multiplicand sign signal, XS, indicative of an unsigned/signed multiplicand mode of operation. The highest order bit of the multiplicand, X7, is connected to a first input of AND gate 48. A sign mode control signal labeled "Sign Mode" is connected to a second input of AND gate 48. When a signed multiplicand number is used, the sign mode signal is at a logic high level to provide signal XS as a copy of the highest rank ordered multiplicand bit X7. When an unsigned multiplicand number is used, the sign mode signal is at a logic low level to provide signal XS as a low logic level signal. The sign mode signal is coupled to predetermined inputs of the two highest column rank multiplexers of all rows of multiplexers.

Figure 3A:
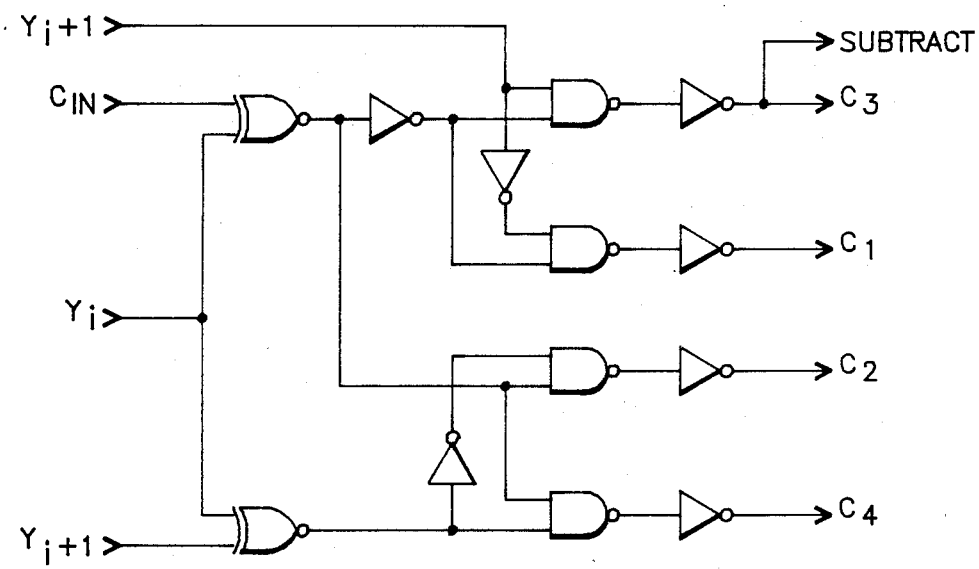
FIGS. 3(a) and 3(b) illustrate in logic diagram form recoder control generation circuits for implementing the multiplier/accumulator according to the present invention.
Figure 3B:
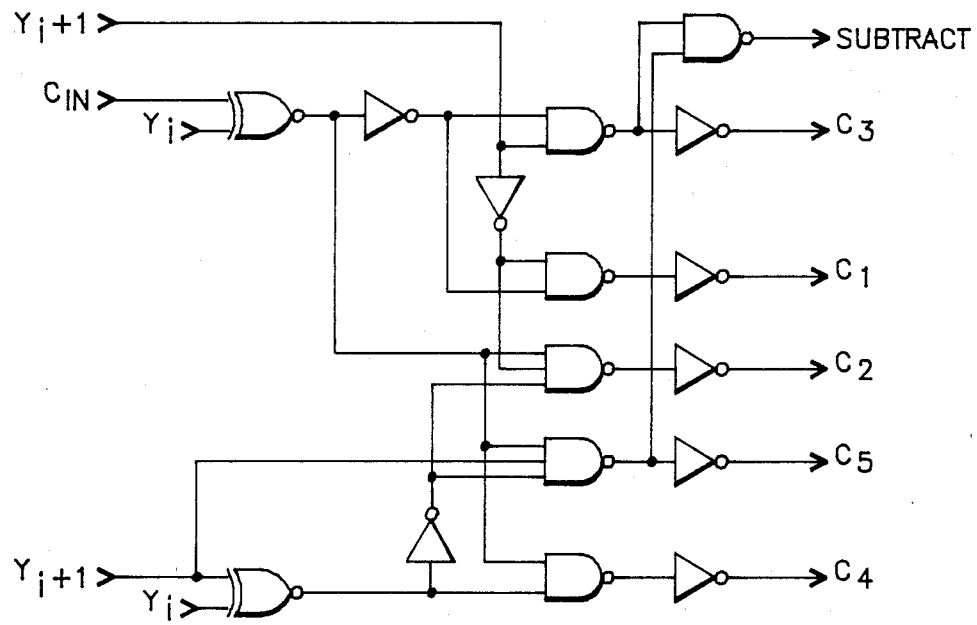

In operation, assume that input bits Y0-Y7, X0-X7 and S0-S15 are coupled substantially simultaneously to the respective inputs illustrated in FIGS. 1(a)-1(d) where Y0-Y7 represent the multiplier and X0-X7 represent the multiplicand. Recoder circuits 17-20 transform the multiplier input into a "number representation" that can be directly used by the mulitplexer and adder portions. Shown in FIG. 3(a) is a logic diagram of a portion of recoder section 11 illustrating a control circuit for recoder circuits 17, 18 and 19. Shown in FIG. 3(b) is a logic diagram of recoder circuit 20.

Referring to FIG. 3(a), the input bit $Y_i$ corresponds to multiplier bits Y0, Y2 and Y4 for recoders 17, 18 and 19, respectively. Similarly, input bit $Y_{i+1}$ corresponds to multiplier bits Y1, Y3 and Y5, respectively. Shown below is a logic table for the circuit of FIG. 3(a).

TABLE 2

| ENCODED VALUE | $Y_{i+1}$ BIT +2 | $Y_i$ WEIGHT +1 | $C_{IN}$ +1 | $C_{OUT}$ +4 | SUBTRACT −1 | \multicolumn{4}{c}{MULTIPLEXER CONTROL LINES} | | | | MULTIPLEXER RESULTS |
|---|---|---|---|---|---|---|---|---|---|---|
| | | | | | | C1 | C2 | C3 | C4 | |
| 0  | 0 | 0 | 0 | 0 | 0 | 0 | 0 | 0 | 1 | 0 |
| +1 | 0 | 0 | 1 | 0 | 0 | 1 | 0 | 0 | 0 | X |
| +1 | 0 | 1 | 0 | 0 | 0 | 1 | 0 | 0 | 0 | X |
| +2 | 0 | 1 | 1 | 0 | 0 | 0 | 1 | 0 | 0 | 2X |
| +2 | 1 | 0 | 0 | 0 | 0 | 0 | 1 | 0 | 0 | 2X |
| +3 | 1 | 0 | 1 | 1 | 1 | 0 | 0 | 1 | 0 | $\bar{x}$ (−X) |
| +3 | 1 | 1 | 0 | 1 | 1 | 0 | 0 | 1 | 0 | $\bar{x}$ (−X) |
| +4 | 1 | 1 | 1 | 1 | 0 | 0 | 0 | 0 | 1 | 0 |

Figure 4A:
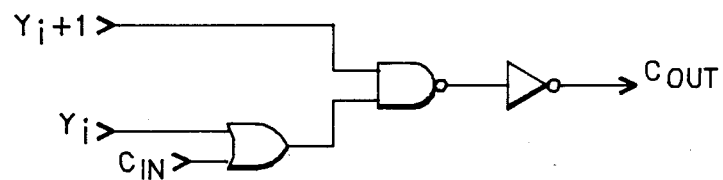
FIGS. 4(a) and 4(b) illustrate in logic diagram form recoder carry generation circuits for implementing the multiplier/accumulator according to the present invention.
Figure 4B:
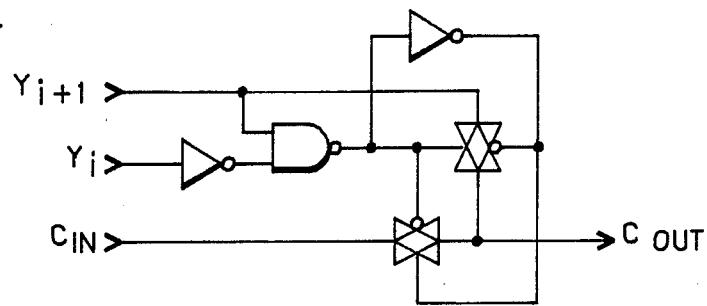

Shown in the table are encoded values for the possible inputs. It should be readily understood that each carry-in signal for recoders 18 and 19 corresponds to the signal coupled via conductors 22 and 23, respectively. The carry-in signal of recoder 18 is a carry-out signal, $C_{OUT}$, of recoder 17 and has a bit weight of four since recoder 17 is using two multiplier bits. Shown in FIG. 4(a) is a carry generation circuit for recoder 17. Shown in FIG. 4(b) is a carry generation circuit for recoders 18 and 19.

Each combination of input bits $Y_i$, $Y_{i+1}$ and $C_{IN}$ provides four output control signals wherein a predetermined one of the four control signals is at a high logic state while the remaining three control signals are at a low logic state. The effective multiplexer result provided by the control signals is also shown in Table 2. For example, when the encoded value of the three input bits is +2, the multiplexer result is to add two times the multiplicand X. This is accomplished by a one bit left shift in the multiplexer. Similarly, when the encoded value of the three input bits is +3, the multiplexer result is to subtract the multiplicand X. The subtraction is performed by adding the two's complement of X. In this case, the multiplexer adds the one's complement of the multiplicand X. The two's complement of X is obtained by adding "one" to the one's complement of X. The "one" which is added is represented by a "1" in the subtract column. The encoded value of +3 is obtained by generating a carry in the recoder carry generation circuit illustrated in FIG. 4(b). The recoder carry output is inputted to the next higher ranked recoder with an effective bit weight of +4 relative to the originating recoder now. The carry encoded value of +4 is added to the −1 encoded value of the multiplexer result to provide an effective +3 encoded value.

Shown in FIG. 3(b) is a control circuit for recoder circuit 20. Input bit $Y_i$ corresponds to bit Y6 and input bit $Y_{i+1}$ corresponds to bit Y7. Carry-in bit $C_{IN}$ is the carry-out bit $C_{OUT}$ of recoder circuit 19. Recoder circuit 20 provides five control signals C1, C2, C3, C4 and C5 in response to bits $Y_i$, $Y_{i+1}$ and $C_{IN}$. A subtract signal illustrated as "subtract" is provided and coupled to a predetermined input of adder circuit 40. Illustrated below is a truth table for the circuit of FIG. 3(b) which illustrates the control line output for the possible input combinations.

TABLE 3

| ENCODED VALUE | $Y_{i+1}$ BIT −2 | $Y_i$ WEIGHT +1 | $C_{IN}$ +1 | SUBTRACT −1 | \multicolumn{5}{c}{MULTIPLEXER CONTROL LINES} | | | | | MULTIPLEXER RESULTS |
|---|---|---|---|---|---|---|---|---|---|---|
| | | | | | C1 | C2 | C3 | C4 | C5 | |
| 0  | 0 | 0 | 0 | 0 | 0 | 0 | 0 | 1 | 0 | 0 |
| +1 | 0 | 0 | 1 | 0 | 1 | 0 | 0 | 0 | 0 | X |
| +1 | 0 | 1 | 0 | 0 | 1 | 0 | 0 | 0 | 0 | X |
| +2 | 0 | 1 | 1 | 0 | 0 | 1 | 0 | 0 | 0 | 2X |
| −2 | 1 | 0 | 0 | 1 | 0 | 0 | 0 | 0 | 1 | $\overline{2X}$ |
| −1 | 1 | 0 | 1 | 1 | 0 | 0 | 1 | 0 | 0 | $\bar{x}$(−X) |
| −1 | 1 | 1 | 0 | 1 | 0 | 0 | 1 | 0 | 0 | $\bar{x}$(−X) |
| 0  | 1 | 1 | 1 | 0 | 0 | 0 | 0 | 1 | 0 | 0 |

The previous recoders 17, 18 and 19 each encoded a predetermined two bit multiplier portion as an unsigned encoded value. Recoder 20 encodes a predetermined two bit multiplier portion as a signed encoded value. This can be seen from the above truth table where bit $Y_{i+1}$ has an effective bit weight of −2 because it is in the sign bit position of the multiplier number. Recoder 20 may also be used as an unsigned recoder for multiple precision multiplier numbers. The multiple precision multiplier number will consist of a multitude of Y multiplier values where the most significant Y value is signed and the remaining Y values are unsigned. The most significant multiplier value contains a sign bit and requires a signed multiplier encoding for recoder 20. The remaining portions of the multiplier value require an unsigned multiplier encoding for recoder 20. A typical sequence of operations is to multiply each multiplicand X value by a series of multiplier Y values from the least significant to the most significant Y value. The carry-out output, $C_{OUT}$, of recoder 20 is used as a carry-in to recoder 17 on each immediately successive multiplication operation. The carry-out signal of recoder 20 is the same as input multiplier bit Y7. The introduction of Y7 as a carry input to the next higher order multiplier Y value adds an effective bit weight of +4 relative to recoder 20. The sum of the Y7 bit weights is (−2+4) and provides an effective bit weight of +2 for Y7. This is the same bit weight as an unsigned recoder. Thus, the introduction of the recoder 20 carry-out output into recoder 17 carry-in input on a next higher order multiplier Y value converts the previous Y multiplier encoding to an unsigned value.

Figure 5A:
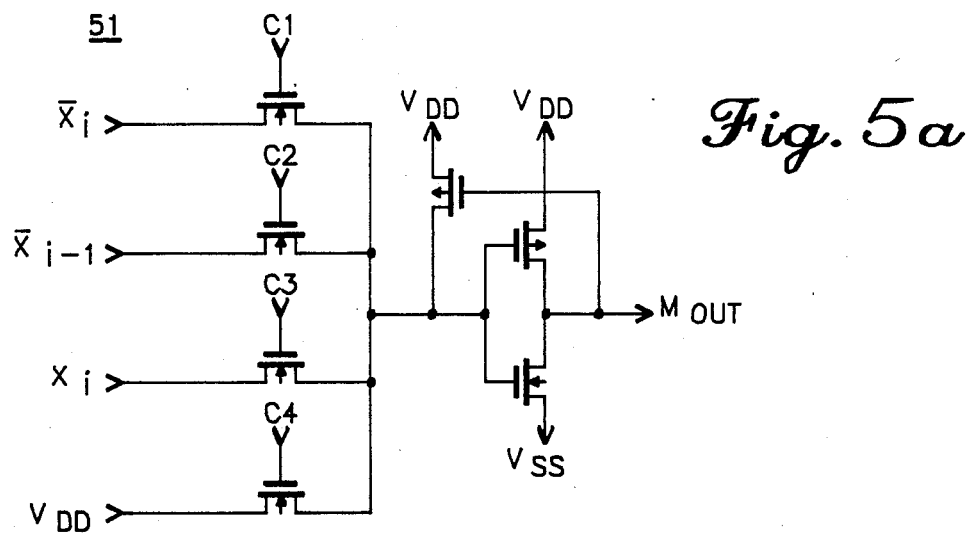
FIGS. 5(a) and 5(b) illustrate in schematic form multiplexer circuits having four inputs for implementing the multiplier/accumulator according to the present invention.
Figure 5B:
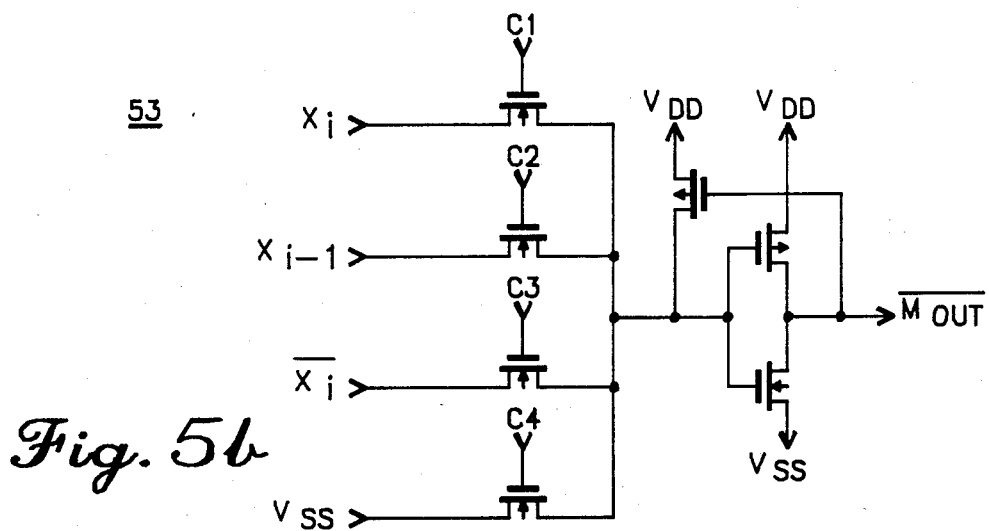

Shown in FIGS. 5(a) and 5(b) are schematic diagrams of multiplexer circuits 51 and 53, respectively. The circuits of FIGS. 5(a) and 5(b) are identical with the exception that opposite polarities of multiplexer input bits are controlled by control signals C1, C2, C3 and C4. Multiplexer circuit 51 has a positive logic output where a binary one is represented as a high logic level. Multiplexer circuit 53 has a negative logic output where a binary one is represented as a low logic level. Table 4 below illustrates the truth table for multiplexer circuits 51 and 53 assuming a multiplexer column rank of i.

TABLE 4

| C1 | C2 | C3 | C4 | $M_{OUT}$ | $\overline{M_{OUT}}$ |
|---|---|---|---|---|---|
| 1 | 0 | 0 | 0 | $X_i$ | $\overline{X_i}$ |
| 0 | 1 | 0 | 0 | $X(i-1)$ | $\overline{X}(i-1)$ |
| 0 | 0 | 1 | 0 | $\overline{X_i}$ | $X_i$ |
| 0 | 0 | 0 | 1 | 0 | 1 |

It should be noted that the logic polarity of input bits at the predetermined inputs is inverted in each multiplexer circuit 51 and 53. The logic polarity of the multiplexer output, $M_{OUT}$, and the inverse thereof, is the inverse of the logic polarity of the predetermined input bits. An explanation of which polarity of multiplexer output is used will be given below.

Figure 6A:
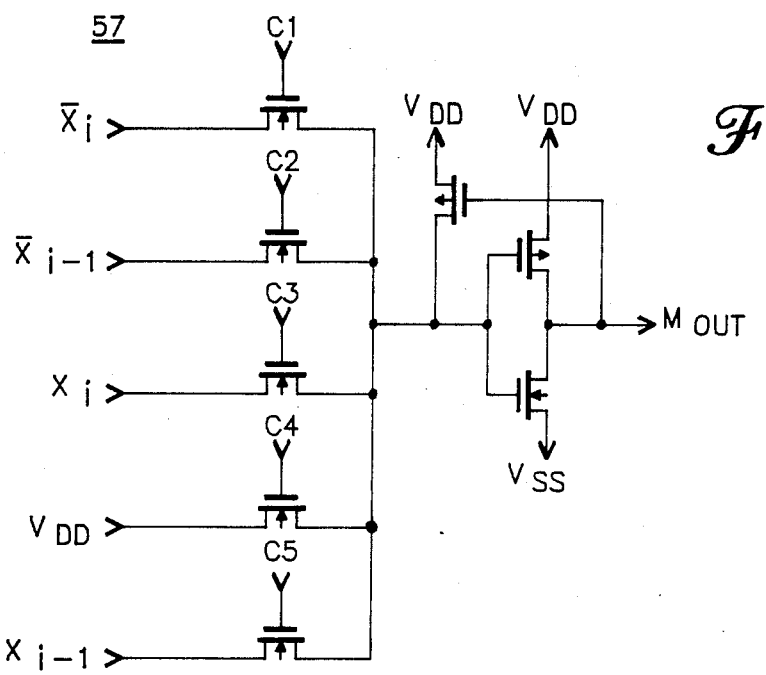
FIGS. 6(a) and 6(b) illustrate in schematic form multiplexer circuits having five inputs for implementing the multiplier/accumulator according to the present invention.
Figure 6B:
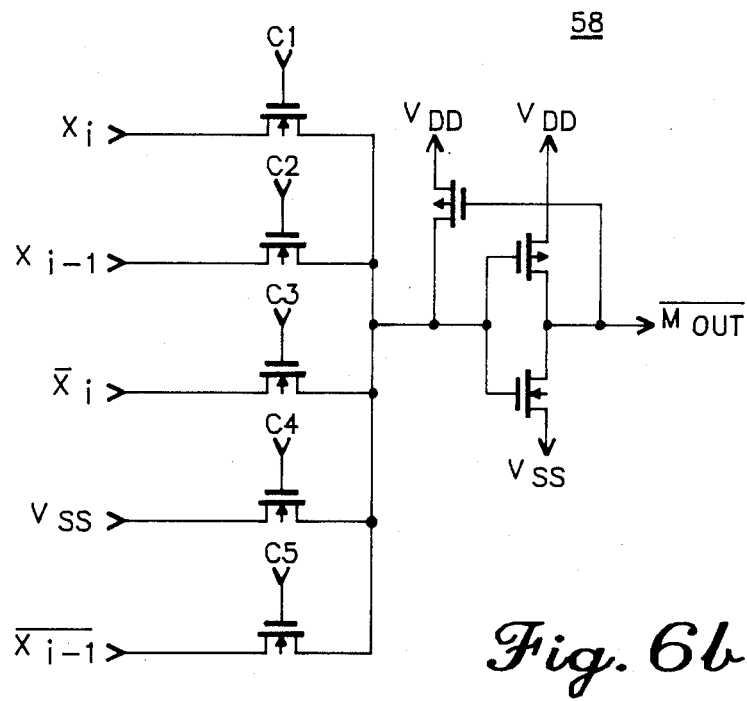

Shown in FIGS. 6(a) and 6(b) are schematic diagrams of five input multiplexer circuits which are used in the highest ranked row of multiplexers. The circuits of FIGS. 6(a) and 6(b) are identical with the exception that opposite polarities of multiplexer input bits are controlled by control signals C1, C2, C3, C4 and C5. Table 5 below illustrates the truth table for multiplexer circuits 57 and 58 assuming a multiplexer column rank of i.

TABLE 5

| C1 | C2 | C3 | C4 | C5 | $M_{OUT}$ | $\overline{M_{OUT}}$ |
|---|---|---|---|---|---|---|
| 1 | 0 | 0 | 0 | 0 | $X_i$ | $\overline{X_i}$ |
| 0 | 1 | 0 | 0 | 0 | $X(i-1)$ | $\overline{X}(i-1)$ |
| 0 | 0 | 1 | 0 | 0 | $\overline{X_i}$ | $X_i$ |
| 0 | 0 | 0 | 1 | 0 | 0 | 1 |
| 0 | 0 | 0 | 0 | 1 | $\overline{X}(i-1)$ | $X(i-1)$ |

It should be readily apparent from the multiplexer circuits and associated truth tables that the function of the multiplexer is to couple a predetermined multiplicand bit of predetermined bit weight to an input of an adder circuit having the same column rank. The multiplexer circuits thereby generate partial products in the multiplication operation by providing correct multiplicand values to adders for generating partial sums.

Figure 5C:
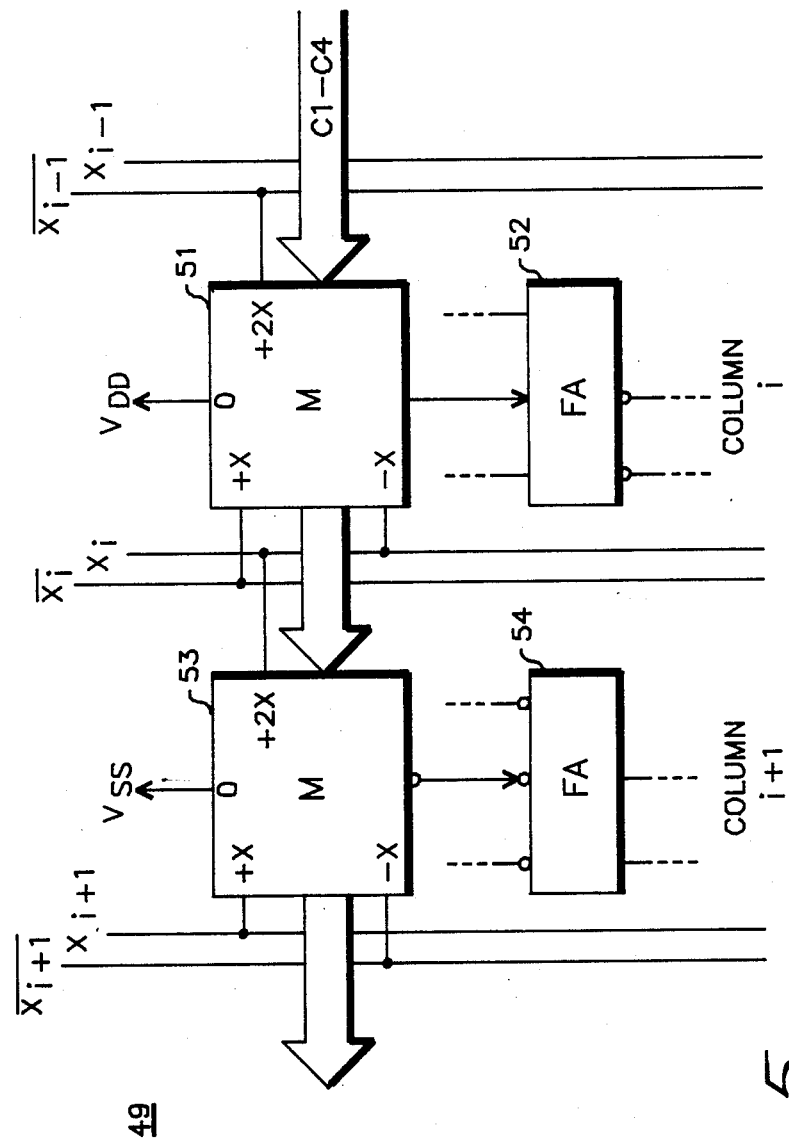
FIG. 5(c) illustrates in block diagram form functional interconnection of multiplexer and adder circuits for implementing the present invention.

Shown in FIG. 5(c) is a portion 49 of the array multiplier/accumulator which illustrates the functional interconnection of multiplexer and adder circuits. For purposes of example only, multiplexers having only four inputs are illustrated. Operation of the multiplexers having five inputs is analogous to operation of multiplexers having four inputs as will be discussed below. Portion 49 illustrates a connection of multiplexer 51 and 53 inputs to multiplicand bits X of predetermined bit weight where both the true and inverse of each multiplicand bit $X_i$ are provided. Portion 49 illustrates a multiplexer 51 which is positioned in an ith column which corresponds to the circuit of FIG. 5(a). Multiplexer 51 has a first input coupled to the inverse of multiplicand bit $X_i$ of the same ranked column. Since multiplexer output circuit 51 inverts the input bit, the bit has a weight of $+X$. A second input of multiplexer 51 is coupled to the inverse of multiplicand bit $X_{i-1}$ of the immediately lower column rank. The multiplexer output has a bit weight of $+2X$ when the second input is coupled to the output of multiplexer 51. A third input of multiplexer 51 is coupled to multiplicand bit $X_i$ of the same column rank. The corresponding multiplexer output has a bit weight of $-X$. A fourth input is coupled to an internal logic high level $V_{DD}$. The multiplexer output has a bit weight of 0. The inverse of the four input bits is coupled to an output of multiplexer 51 in response to control signals C1–C4. The output of multiplexer 51 has a positive logic representation and is coupled to a full adder circuit 52 having the same column rank. Full adder 52 has a positive logic input representation corresponding to the positive logic output of multiplexer 51. Control signals C1–C4 simultaneously couple a corresponding input of a multiplexer 53 having a column rank of $i+1$ to an input of an adder 54. Multiplexer 53 corresponds to the circuit of FIG. 5(b) and has a negative logic output representation. Multiplexer 53 is identical in operation to multiplexer 51 with the exception that a negative output representation of the partial product is provided in response to the control signals C1–C4. Adder 54 has a negative logic input representation corresponding to the negative logic output of multiplexer 53. Simultaneously, other multiplexers not shown but which are in different ranked columns couple an input bit to an adder of different column rank in response to control signals from the same ranked row.

Figure 7A:
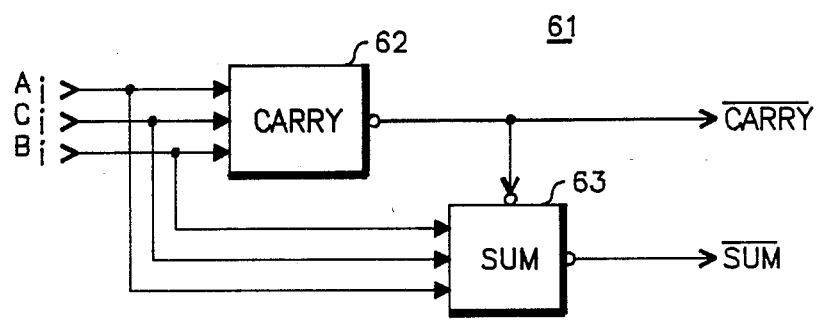
FIG. 7(a) illustrates in block diagram form a carry save full adder circuit for implementing the multiplier/accumulator according to the present invention.

After all multiplexer circuits have generated partial products, the partial products are added by at least $[(Y/2)-2]$ rank ordered rows of carry save adders where a sum word and a carry word are passed down to higher ranked rows. In the preferred form, the carry save adders are adder circuits such as adder circuit 61 illustrated in FIGS. 7(a) and 7(b). Adder circuit 61 generally comprises a carry portion 62 and a sum portion 63, each of which has inputs for receiving sum bits $A_i$ and $B_i$ and a carry-in bit $C_i$. Sum portion 63 has an additional input for receiving the output of carry portion 62. Shown below in Table 6 is a truth table illustrating the carry and sum outputs for all the possible logic combinations of the inputs.

TABLE 6

| $A_i$ | $B_i$ | $C_i$ | $\overline{CARRY}$ | $\overline{SUM}$ |
|---|---|---|---|---|
| 0 | 0 | 0 | 1 | 1 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 0 | 0 |

It should be noted that an inherent characteristic of full adder circuit 61 is to provide inverted sum and carry outputs. As shown in the above truth table, the full adder is totally symmetrical and may be used identically with either positive or negative logic inputs. The full adder outputs will always have an output logic representation which is opposite that of the full adder inputs. Furthermore, since the sum portion 63 utilizes the output of carry portion 62, the output sum propagation delay of adder circuit 61 is substantially twice the output carry propagation delay.

Figure 7B:
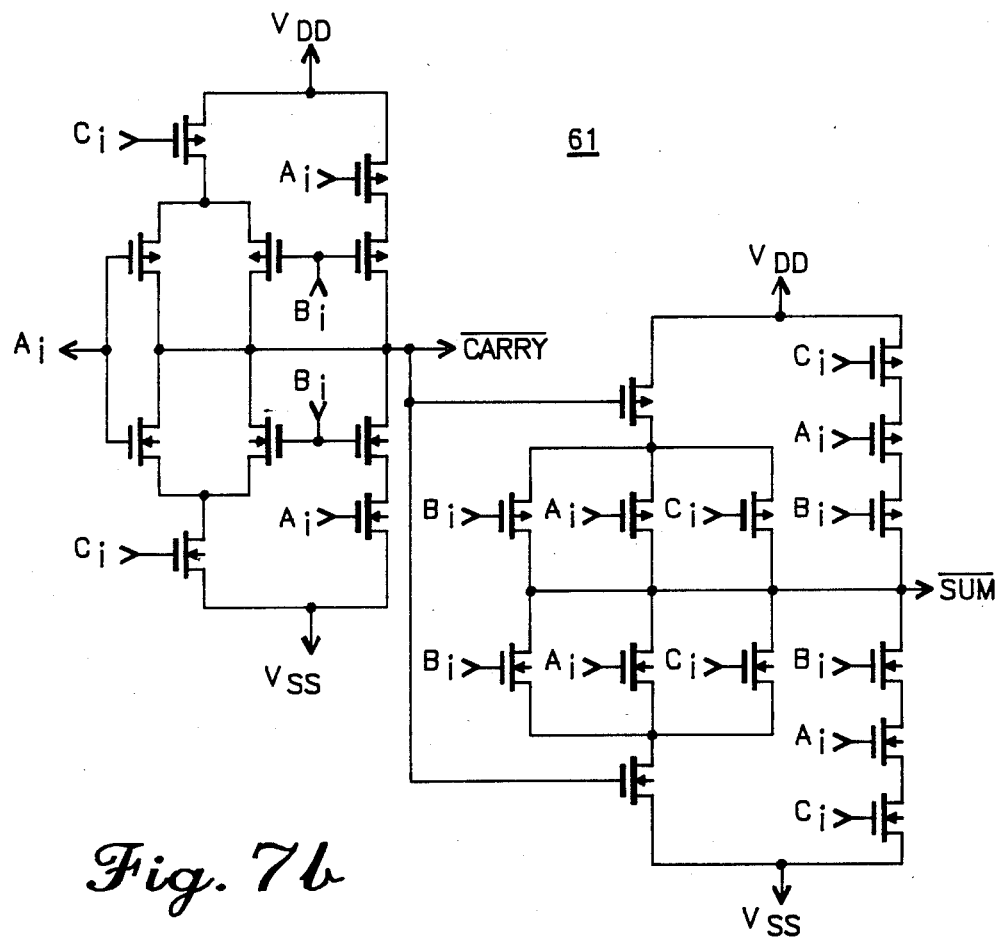
FIG. 7(b) illustrates in schematic form the full adder circuit of FIG. 7(a)

Shown in FIG. 7(b) is a schematic implementation of adder circuit 61. While specific N-channel and P-channel MOS devices are shown, it should be clear that adder circuit 61 could be implemented by utilizing other types of transistors. However, the present invention may also be practiced with any other type of adder circuit and in no way is limited to a particular type of adder circuit.

Figure 8A:
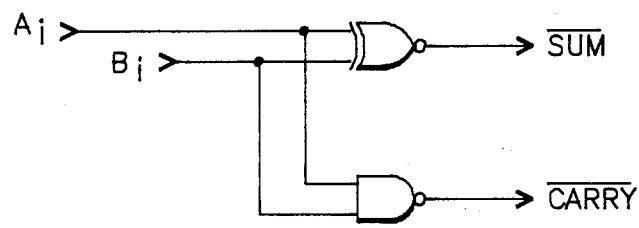
FIG. 8(a) illustrates in logic diagram form a half adder circuit for implementing the multiplier/accumulator according to the present invention.

Shown in FIG. 8(a) is a block diagram of a half adder circuit 71 which may be used in multiplier/accumulator 10 for half adders designated by "HA". Only two input sum bits are utilized and circuit 71 operates in accordance with the following truth table of Table 7.

TABLE 7

| Ai | Bi | $\overline{\text{CARRY}}$ | $\overline{\text{SUM}}$ |
|---|---|---|---|
| 0 | 0 | 1 | 1 |
| 0 | 1 | 1 | 0 |
| 1 | 0 | 1 | 0 |
| 1 | 1 | 0 | 1 |

It should also be noted that the sum and carry outputs are provided in inverted form. The truth table of Table 7 is not symmetrical and can be used for positive logic inputs only. However, half adders with negative logic input representation may also be used to implement the present invention. It should be well understood that any type of half adder circuit could be used to practice the present invention.

Figure 8B:
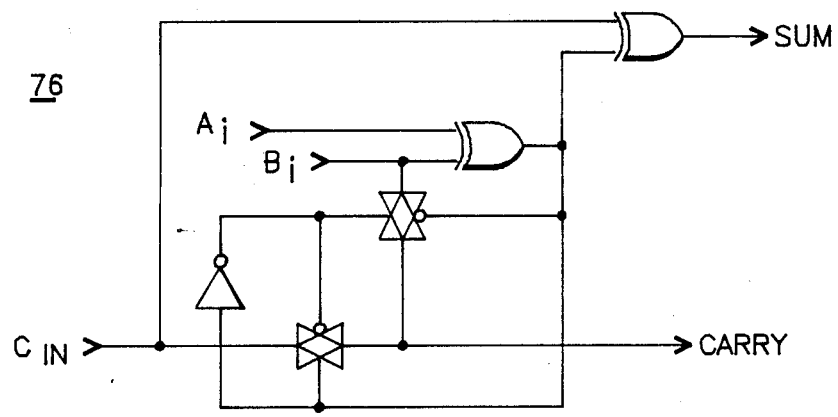
FIG. 8(b) illustrates in logic diagram form a fast carry full adder circuit for implementing the multiplier/accumulator according to the present invention.

In the illustrated form, the highest ranked row of adders are comprised of fast carry full adder circuits. Shown in FIG. 8(b) is a fast carry full adder circuit having sum inputs $A_i$ and $B_i$ and a carry-in input $C_{IN}$. An output sum bit and an output carry bit are provided in non-inverted form. Adder circuit 76 functions in accordance with the following truth table of Table 8.

TABLE 8

| Ai | Bi | $C_{IN}$ | CARRY | SUM |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Adder circuit 76 provides a non-restored logic level at its carry-out output when the carry-in input is directly presented at the carry output. It should be well understood that conventional logic level restoration is periodically required for the carry signal of higher column ranked adders of the highest ranked row of adders. Any type of adder having a fast carry propagation may be used for the highest ranked row of adders. Also, any form of additional adder logic such as carry look ahead or carry selection adders may be used to improve speed of the carry propagation in the highest ranked row of adders.

The multiplicand X may be a signed two's complement number. Each multiplexer produces a partial product which can also be a signed two's complement number where the most significant column rank multiplexers 35, 36, 37 and 38 represent the sign bit of each partial product. The contribution of these sign bits must be extended out to the sign bit P15 of the result which is in the (X+Y−1) ranked column. The circuits of sign bit extension portion 14 function as sign bit combiners to combine the contributions of two partial product sign bits. In particular, one of the inputs of the sign bit extension logic is the sign bit of a partial product having the current column rank. The other input is the total composite sign of all lower column ranked partial product sign bits. The output of each of the sign bit extension logic circuits is the composite sign contribution to the current column rank and a composite sign bit to be extended to all higher column ranks. This composite sign bit is effectively extended to the sign bit of the output product P15 by higher column ranked sign bit extension logic. Therefore, each sign bit extension logic circuit provides or contributes two bits of a sign extension to the total product. The combination of all sign bit extension circuits provides a complete sign extension from the sign bit of the lowest row ranked multiplexer representing the lowest column ranked sign bit to the highest column ranked output sign bit P15. This iterative technique provides a signed multiplication capability and does not require an additional row of adders for sign extension correction.

Use of inverting logic of inputs and outputs between rows of multiplexers and adders of the multiplier/accumulator 10 increases the propagation speed of bits through a column of the array. Although predetermined logic polarities of inputs and outputs of multiplexers and adders are illustrated, numerous combinations of inverting cell logic may be utilized. The reason for using inverting logic levels is to take advantage of the inherent inverting characteristics of the adders implemented by the illustrated embodiment. When an adder receives an input in true or noninverted form, the output is provided in inverted form. Similarly, the logic form of the inputs to the multiplexers determine the logic form of the outputs thereof. Occasionally, the logic form of an output of an adder is not the same as the logic form of the input to which it is coupled. Therefore, a few inverter circuits which are not specifically labeled are required as shown in FIGS. 1(a)–(d) to provide a proper logic form of a signal before being coupled to an adder circuit of higher row rank. The use of inverting logic levels greatly reduces the number of logic level inversions required in every column and provides faster circuit operation.

Figure 9A:
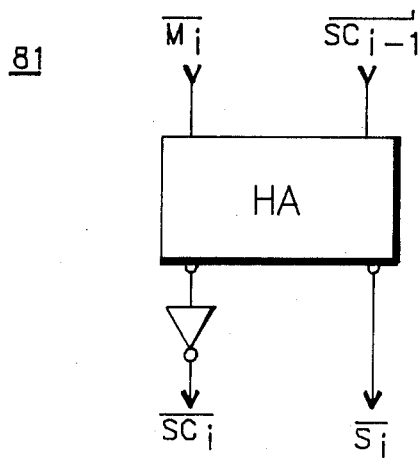
FIG. 9(a) illustrates in block diagram form a sign extension circuit having two inputs.

Shown in FIG. 9(a) is a sign bit extension circuit 81 having two inputs and which is used in the sign bit extension portion 14 as circuits 45 and 46. A first input of circuit 81 is a predetermined multiplexer output from an ith ranked column designated by "$\overline{M_i}$" and is in negative logic form. A second input of circuit 81 is a sign carry input from a previous column designated by "$\overline{SC_{i-1}}$" and is also in negative logic form. Sign bit extension circuit 81 provides a sign output, "$\overline{S_i}$", in negative logic form and a sign carry output designated by "$\overline{SC_i}$", also in negative logic form. Sign bit extension circuit 81 operates in accordance with the truth table illustrated in Table 9.

TABLE 9

| $\overline{M_i}$ | $\overline{SC_{i-1}}$ | SIGN EXTENSION VALUE | $\overline{SC_i}$ | $\overline{S_i}$ |
|---|---|---|---|---|
| 0 | 0 | −2 | 0 | 1 |
| 0 | 1 | −1 | 0 | 0 |
| 1 | 0 | −1 | 0 | 0 |
| 1 | 1 | 0 | 1 | 1 |

The value of the sign extension is indicated in Table 9 for a predetermined input. The effective bit weight of each input is −1 and indicates that a negative sign extension is required for the present and higher column ranks of the product. The sign extension value of −2 indicates that two negative contributions are present in the ith column, one from the ith column and one from the combining of all previous partial products. The sign extension of −1 and 0 indicates that one or no negative contributions are present in the ith column rank. These sign extensions of 2, 1 or 0 negative contributions indicate that the values −2, −1 or 0, respectively, should be added to the product relative to the ith column rank. Sign extension bit circuit 81 may be readily implemented by the half adder circuit of FIG. 8(a) with an inverter coupled to the $SC_i$ output.

Figure 9B:
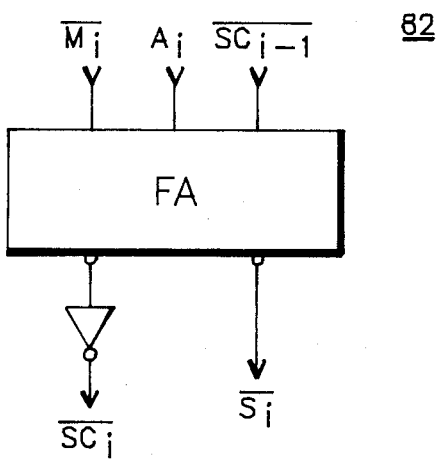
FIG. 9(b) illustrates in block diagram form a sign extension circuit having three inputs.

Shown in FIG. 9(b) is a sign bit extension circuit 82 having three inputs and which is used in sign bit extension portion 14 as circuit 44. Two of the three inputs are analogous to the two inputs of circuit 81. The third input of circuit 82, $A_i$, is a predetermined bit of the accumulator input number. Circuit 82 functions in accordance with the following truth table of Table 10.

TABLE 10

| $A_i$ | $\overline{M_i}$ | $\overline{SC_{i-1}}$ | SIGN EXTENSION VALUE | $\overline{SC_i}$ | $S_i$ |
|---|---|---|---|---|---|
| 0 | 0 | 0 | −2 | 0 | 1 |
| 0 | 0 | 1 | −1 | 0 | 0 |
| 0 | 1 | 0 | −1 | 0 | 0 |
| 0 | 1 | 1 | 0 | 1 | 1 |
| 1 | 0 | 0 | −1 | 0 | 0 |
| 1 | 0 | 1 | 0 | 1 | 1 |
| 1 | 1 | 0 | 0 | 1 | 1 |
| 1 | 1 | 1 | +1 | 1 | 0 |

The value of the sign extension is given for predetermined values of the inputs. Sign bit extension circuit 82 may be implemented by utilizing a full adder such as circuit 61 of FIG. 7(b) with an inverter coupled to the $SC_i$ output.

The multiplier/accumulator output is the sum of the (X+Y) bit product and the (X+Y) bit input number. It is possible that the addition of two (X+Y) bit numbers will yield a (X+Y+1) bit output from the multiplier/accumulator. Such an output would exceed the number of output bits provided and would result in an incorrect number at the multiplier/accumulator output. This is called an arithmetic overflow and may be in a positive or a negative direction. It is desirable to detect such an error.

Figure 10:
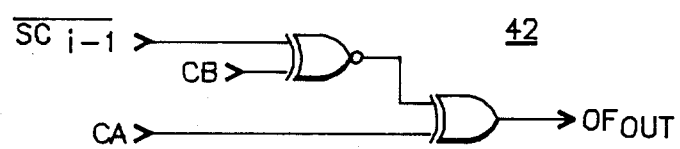
FIG. 10 illustrates in logic diagram form an overflow circuit for implementing the multiplier/accumulator according to the present invention.

Shown in FIG. 10 is a logic diagram of overflow circuit 42. Overflow circuit 42 functions in accordance with the following truth table of Table 11.

TABLE 11

| $\overline{SC_{i-1}}$ | CB | CA | SIGN EXTENSION VALUE | $OF_{OUT}$ |
|---|---|---|---|---|
| 0 | 0 | 0 | −1 | 1 |
| 0 | 0 | 1 | 0 | 0 |
| 0 | 1 | 0 | 0 | 0 |
| 0 | 1 | 1 | +1 | 1 |
| 1 | 0 | 0 | 0 | 0 |
| 1 | 0 | 1 | +1 | 1 |
| 1 | 1 | 0 | +1 | 1 |
| 1 | 1 | 1 | +2(NA) | 0(NA) |

As shown in Table 11, overflow circuit 42 combines the sign carry output and adder carry outputs of column rank one greater than the highest column rank of the multiplier/accumulator output. This combination indicates the sign extension value for column ranks higher than the sign bit P15 of the multiplier/accumulator output. Any sign extension other than a zero (no sign extension) would indicate an overflow condition as shown by the $OF_{OUT}$ output. A sign extension value of +2 is not possible because of the adder array interconnections, and is indicated as not applicable, "NA", in the truth table above. Since the multiplier/accumulator output is bounded to (X+Y+1) bits, only sign extensions of −1, 0 and +1 are possible. The overflow output value of 0 for a sign extension value of +2 is used to provide an easy implementation of the overflow circuit.

It should be noted that overflow circuit 42 could be replaced by circuitry for controlling additional adders of higher column rank in the highest ranked adder row. As shown by the sign bit extension value in the above truth table, such replacement circuitry could increment, decrement, or have no effect on predetermined bits of additional adders of higher column rank in the highest ranked adder row. This will allow an accumulator extension to accomodate increasing multiplier/accumulator output word size in repetitive multiply/accumulate operations. These adders would have input accumulator bits (not shown) of higher column rank and would provide additional multiplier/accumulator output bits (not shown) of higher column rank.

An illustration of the operation of the multiplier/accumulator of the present invention utilizing eight bit multiplier values will be given below. For a two's complement signed integer, the eight bit multiplier value can represent numbers in the range −128 to +127. Therefore, the multiplier output must be capable of producing every multiple of the multiplicand value X from −128X to +127X. The multiplier output will be the sum of the accumulator input number and the four partial products generated by four ranked ordered rows of multiplexers as described above. Each multiplexer can provide one of the predetermined multiples of the multiplicand value X as shown in the following Table 12.

| MULTIPLEXER ROW | MULTIPLEXER RESULT | | | | |
|---|---|---|---|---|---|
| | 0 | +X | −X | +2X | −2X |
| 1 | 0 | +X | −X | +2X | — |
| 2 | 0 | +4X | −4X | +8X | — |
| 3 | 0 | +16X | −16X | +32X | — |
| 4 | 0 | +64X | −64X | +128X | −128X |

As shown in Table 12 above, the first three lower ranked rows of multiplexers provide one of four sets of predetermined partial product outputs in response to control signals from the recoder section. The highest ranked row of multiplexers provides one of five sets of predetermined partial product outputs in response to control signals from the recoder section. The highest ranked row of multiplexers provides a fifth input to accomodate the sign bit of the multiplier Y value. The effective multiplication performed by the partial product generation is the combination of the recoder control selection and the column rank of the multiplexer row in the multiplier array.

Each multiplexer row will select one of its possible partial product outputs per table 12 above. These partial product outputs are summed along with the accumulator input number by the adders in the multiplier array to produce the accumulated product. This operation is best shown by Table 13 below.

| MULTIPLIER Y VALUE | | PARTIAL PRODUCT | | | | ACCUMULATED |
|---|---|---|---|---|---|---|
| DECIMAL | BINARY | ROW 4 | ROW 3 | ROW 2 | ROW 1 | PRODUCT |
| 127  | 01 11 11 11 | +128X | +0   | +0   | −X  | +127X |
| 64   | 01 00 00 00 | +64X  | +0   | +0   | +0  | +64X  |
| 32   | 00 10 00 00 | +0    | +32X | +0   | +0  | +32X  |
| 4    | 00 00 01 00 | +0    | +0   | +4X  | +0  | +4X   |
| 3    | 00 00 00 11 | +0    | +0   | +4X  | −X  | +3X   |
| 2    | 00 00 00 10 | +0    | +0   | +0   | +2X | +2X   |
| 1    | 00 00 00 01 | +0    | +0   | +0   | +X  | +X    |
| 0    | 00 00 00 00 | +0    | +0   | +0   | +0  | +0    |
| −1   | 11 11 11 11 | +0    | +0   | +0   | −X  | −X    |
| −2   | 11 11 11 10 | +0    | +0   | −4X  | +2X | −2X   |
| −32  | 11 10 00 00 | −64X  | +32X | +0   | +0  | −32X  |
| −64  | 11 00 00 00 | −64X  | +0   | +0   | +0  | −64X  |
| −127 | 10 00 00 01 | −128X | +0   | +0   | +X  | −127X |
| −128 | 10 00 00 00 | −128X | +0   | +0   | +0  | −128X |

As indicated in Table 13 above, the multiplier Y value is encoded two bits at a time by the multiplier recoders into control signals which select the appropriate partial product outputs for each multiplexer row. These partial product selections are made in accordance with tables 12 and 13 above. The accumulated product is the sum of the four multiplexer rows and represents the accumulated partial products. The multiplier/accumulator output is the sum of the accumulator input number and the accumulated product. The effective multiplication factor applied to the multiplicand X input is seen to be identical to the multiplier Y value. Hence, two's complement signed multiplication with input accumulation is shown for the present invention.

When the present invention is utilized as only a multiplier, the input bits S0–S15 are coupled to logic zeroes which effectively accumulates the number zero with the X×Y bit product. This mode of operation is easily accomplished since the accumulator inputs are positioned at the top of the array. A further advantage of the location of the accumulator inputs is the reduction of an additional row of adders which is typically required if the accumulator inputs are positioned at the bottom of the array.

In another form, the present invention may also be utilized as only a multiplier having no external number accumulation function. In this form, one less row of adders is required due to the reduction in the number of summations required so that only [(Y/2)−1] ranked rows of adders are provided. In particular, the lowest ranked row of adders illustrated in FIGS. 1(a)-1(d) would not be required since inputs S0–S15 would not exist. The remaining two inputs of each adder of the presently illustrated lowest ranked row of adders could be coupled to higher row ranked adders in the same manner as the outputs of the presently illustrated adders of lowest row rank are coupled in FIGS. 1(a)-1(d).

By now it should be apparent that a multiplier and a multiplier/accumulator which encodes and utilizes modified Booth's algorithm has been provided. The present invention utilizes adder circuits using inverting logic for reducing propagation delays, circuit size and complexity. An important resulting feature of the present invention is that an array having a regular structure is maintained while utilizing a sum skipping technique and inverting cell logic in a carry save adder array which utilizes modified Booth's recoding for generating partial products. Sign bit extension circuitry is provided which minimizes propagation delays in the array. Recoder logic for implementing modified Booth's algorithm in the multiplier utilizes carry circuitry which can provide multiple precision multiplication. The number of adder rows required to perform a composite multiply/accumulate operation has been minimized by the present invention.

We claim:

1. An X×Y bit array multiplier/accumulator circuit, for adding an input number having (X+Y) bits to an (X+Y) bit product of an X bit number and a Y bit number, for providing an accumulated product, where X and Y are integers, comprising:

encoding means for implementing a predetermined algorithm and providing a rank ordered plurality of first control signals in response to the Y bit number;

a rank ordered plurality of multiplexer means forming at least (Y/2) rank ordered rows and (X+Y) rank ordered columns, each of the multiplexer means having a plurality of control inputs, each control input being coupled to a predetermined one of the rank ordered first control signals, for coupling either a predetermined one of a plurality of input bits of the X bit number of predetermined bit weight or a predetermined logic level to an output thereof; and a rank ordered plurality of adder means coupled to the multiplexer means and forming at least (Y/2) rank ordered rows, each of said adder means having a predetermined column rank within said (X+Y) columns, the highest ranked row of the adder means providing an accumulated product output number, the remaining rows providing output sum and carry bits of predetermined bit weight, each adder means of the remaining rows providing a partial product output sum bit of predetermined bit weight which is coupled to an input of an adder means having a higher row rank and the same column rank, at least one row of said adder means having each partial product output sum bit thereof coupled to an adder input of adder means of corresponding column rank and at least two row ranks greater.

2. The X×Y bit array multiplier/accumulator circuit of claim 1 wherein each of said (Y/2) rank ordered rows of multiplexing means comprises (X+2) multiplexers, the first of the (X+2) multiplexers of each row coupling either a predetermined logic level or the least significant bit of the X bit number to a multiplexer output thereof in response to a predetermined one of the first control signals, and each of the remaining multiplexers of each row coupling one of two predetermined bits of the X bit number to a multiplexer output thereof in response to a predetermined one of the first control signals.

3. The X×Y bit array multiplier/accumulator circuit of claim 1 wherein said (Y/2) rows of adder means comprise:
[(Y/2)−2] rows of (X+1) adders, each of the adders having at least two inputs, each input adapted for receiving either a predetermined one of the (X+Y) bits of the input number, an output from a predetermined one of the multiplexing means, or a predetermined one of the partial product output sum bits;
one row of (X+Y−4) adders of next to highest row rank, each of said (X+Y−4) adders having a predetermined column rank and three inputs, each input adapted for receiving an input bit representing either a partial product output sum bit, an output from a predetermined one of the multiplexing means, or a bit of the input number; and
one row of (X+Y) carry propagate adders of greatest row rank, each of said (X+Y) adders having a predetermined column tank and three inputs, each input receiving a predetermined one of either a sum input bit, a carry input bit, an output bit from a predetermined one of the multiplexing means, a predetermined bit of the input number, a carry bit from the carry propagate adder of immediately lower column rank, if any, or a predetermined one of the first control signals, each of said carry propagate adders providing a predetermined bit of the sum of the input number and the product of the X bit and Y bit numbers.

4. The X×Y bit array multiplier/accumulator circuit of claim 3 wherein said adder means of all ranked rows except the highest ranked row utilize inverting logic wherein the logic levels of the inputs thereof are opposite the logic levels of the outputs thereof.

5. The X×Y bit array multiplier/accumulator circuit of claim 3 wherein the adders of the [(Y/2)−2] rows of (X+1) adders and the adders of the row of (X+Y−4) adders are carry-save adders.

6. The X×Y bit array multiplier/accumulator circuit of claim 1 wherein the encoding means further comprise:
a rank ordered plurality of logic circuits, each of the logic circuits receiving two predetermined bits of the Y bit number, the lowest ranked logic circuit receiving a carry input bit and providing a carry output to the next higher ranked logic circuit, the highest ranked logic circuit providing a carry output bit which is the same bit as the highest ranked Y bit, the remainder of the logic circuits having a carry output terminal coupled to a carry input terminal of the next higher ranked 7. The X×Y bit array multiplier/accumulator circuit of claim 6 wherein the carry output of the highest ranked logic circuit is coupled to a carry input terminal of the lowest ranked logic circuit, for providing multiple precision multiplier values.

8. The X×Y bit array multiplier/accumulator circuit of claim 1 further comprising:
logic means for providing a signed/unsigned mode signal in response to both a sign mode control signal and the highest weight bit of the X bit number, the mode signal being coupled to predetermined inputs of the two highest column ranked multiplexer means of each row of multiplexer means.

9. The X×Y bit array multiplier/accumulator circuit of claim 1 further comprising:
sign bit extension means coupled to the multiplexing means and the adder means, for providing an output sign bit for the accumulated product.

10. The X×Y bit array multiplier/accumulator circuit of claim 1 wherein said predetermined algorithm is Booth's algorithm.

11. The X×Y bit array multiplier/accumulator circuit of claim 1 wherein said predetermined algorithm is modified Booth's algorithm.

12. An X×Y bit array multiplier/accumulator circuit, for adding an input number having (X+Y) bits to an (X+Y) bit product of an X bit number and a Y bit number, where X and Y are integers, to provide an accumulated product, comprising:
encoding means for implementing a predetermined algorithm and providing a rank ordered plurality of first control signals in response to the Y bit number;
at least (Y/2) rank ordered rows of (X+2) rank ordered multiplexing means, said multiplexing means forming (X+Y) rank ordered column, wherein said first row includes multiplexing means forming columns of rank 1 to (X+2), said (Y/2)th row includes multiplexing means forming columns of rank (Y−1) to (X+Y), the remaining rows of multiplexing means, if any, having multiplexing means each of which is included in a predetermined column and the first multiplexing means of each remaining row having a column rank which is two ranks greater than the first multiplexing means of the row of immediately lower rank, the first of the (X+2) multiplexing means of each row coupling either a predetermined logic level or the least significant bit of the X bit number to a multiplexer output thereof in response to a predetermined one of the first control signals, the (X+2)nd of the multiplexing means of each row coupling a sign mode control signal to a multiplexer output thereof in response to a predetermined one of the first control signals, and the remainder of the multiplexing means of each row coupling a predetermined one of two predetermined bits of the X bit number to a multiplexer output thereof, in response to the first control signals;
at least (Y/2) rank ordered rows of adder means, including:
[(Y/2)−2] rows of (X+1) adders, each of said (X+1) adders having a predetermined column rank and an output sum propagation delay which is substantially twice an output carry delay thereof, each of said adders having at least two inputs, each input adapted for receiving either a predetermined one of the (X+Y) bits of the input number, a partial product bit or an output from a predetermined one of said multiplexing means, each of said adders of the ranked [(Y/2)−2] rows except the highest ranked row having a sum output for providing a partial product sum of predetermined column rank which is coupled to an adder input of an adder having the same column rank and a row rank at least two ranks greater, and a carry output for providing a carry input signal to an adder input of an adder having a column rank one rank greater and a row rank at least one rank greater, each of said adders of the highest ranked row having a sum output and a carry output, said sum output providing a sum input to an adder having the same column rank and a row rank at least one rank greater, and said carry output providing a carry input signal to an adder having a column rank and a row rank one rank greater;

one row of (X+Y−4) adders of next to greatest row rank, each of said (X+Y−4) adders having a predetermined column rank and three inputs, each input adapted for receiving an input bit representing either a partial product bit, an output from a predetermined one of the multiplexing means, or a bit of the input number; and one row of (X+Y) carry propagate adders of greatest row rank, each of said (X+Y) adders having a predetermined column rank and three inputs, each input receiving a predetermined one of either a sum input bit, a carry input bit, an output bit from a predetermined one of the multiplexing means, a predetermined bit of the input number, a carry bit from the carry propagate adder of immediately lower column rank, if any, or a predetermined one of the first control signals, each of said carry propagate adders providing a predetermined bit of the accumulated product.

13. The X+Y bit array multiplier/accumulator circuit of claim 12 wherein said adder means of all ranked rows except the highest ranked row utilize inverting logic wherein the logic levels of the inputs thereof are opposite the logic levels of the outputs thereof.

14. The X×Y bit array multiplier/accumulator circuit of claim 12 wherein the adders of all rows of adders except the row of (X+Y) carry propagate adders are carry save adders.

15. The X×Y bit array multiplier/accumulator circuit of claim 12 further comprising:
logic means for providing a signed/unsigned mode signal in response to both a sign mode control signal and the highest weight bit of the X bit number, the mode signal being coupled to predetermined inputs of the two highest column ranked multiplexer means of each row of multiplexer means.

16. The X×Y bit array of claim 12 further comprising:
sign bit extension means coupled to the multiplexing means and to the adders, for providing an output sign bit as the highest weighted bit of the (X+Y) bit accumulated product.

17. The X×Y bit array multiplier circuit of claim 12 wherein the predetermined algorithm is modified Booth's algorithm.

18. An X×Y bit array multiplier circuit for providing a product of an X bit number and a Y bit number, where X and Y are integers, comprising:
encoding means for implementing a predetermined algorithm and providing a rank ordered plurality of first control signals in response to the Y bit number;

a rank ordered plurality of multiplexer means forming at least (Y/2) rank ordered rows and (X+Y) rank ordered columns, each of the multiplexer means having a plurality of control inputs, each control input being coupled to a predetermined one of the rank ordered first control signals, for coupling a predetermined one of the rank ordered first control signals, for coupling a predetermined one of a plurality of input bits of the X bit number of predetermined bit weight to an output; and a rank ordered plurality of adder means forming at least [(Y/2)−1] rank ordered rows, each of said adder means having a predetermined column rank within said (X+Y) columns, the highest ranked row of the adder means providing a product output number, all remaining rows providing output sum and carry bits of predetermined bit weight, each adder means of the remaining rows providing a partial product output sum bit of predetermined bit weight which is coupled to an input of an adder means having a higher row rank and the same column rank, at least one row of said adder means having each partial product output sum bit thereof coupled to an adder input of adder means of corresponding column rank and at least two row ranks greater.

19. The X×Y bit array multiplier circuit of claim 18 further comprising:
sign bit extension means coupled to the multiplexing means and the adder means, for providing an output sign bit for the product.

20. The X×Y bit array multiplier circuit of claim 18 wherein the predetermined algorithm is modified Booth's algorithm.

* * * * *

UNITED STATES PATENT AND TRADEMARK OFFICE
CERTIFICATE OF CORRECTION

PATENT NO. : 4,575,812

DATED : March 11, 1986

INVENTOR(S) : Kevin L. Kloker et al

It is certified that error appears in the above-identified patent and that said Letters Patent is hereby corrected as shown below:

In the Claims:

In claim 3, column 19, line 21, change "tank" to --rank--.

In claim 6, column 19, line 53, after "ranked" add --logic circuit.--.

In claim 12, column 20, line 21, change "column" to --columns--.

Signed and Sealed this

Tenth Day of June 1986

[SEAL]

Attest:

Attesting Officer

DONALD J. QUIGG

Commissioner of Patents and Trademarks